US012696917B2

(12) United States Patent
Lu et al.

(10) Patent No.: US 12,696,917 B2
(45) Date of Patent: Aug. 4, 2026

(54) PREPARATION METHOD OF EASY-TO-COOK WHOLE GRAIN BASED ON MICROWAVE-INDUCED CRACKING

(71) Applicant: Institute of Food Processing, HAAS, Harbin (CN)

(72) Inventors: Shuwen Lu, Harbin (CN); Chuanying Ren, Harbin (CN); Bin Hong, Harbin (CN); Shan Zhang, Harbin (CN); Dixin Sha, Harbin (CN); Junran Feng, Harbin (CN); Di Yuan, Harbin (CN); Bo Li, Harbin (CN)

(73) Assignee: Institute of Food Processing, HAAS, Harbin (CN)

( * ) Notice: Subject to any disclaimer, the term of this patent is extended or adjusted under 35 U.S.C. 154(b) by 353 days.

(21) Appl. No.: 18/243,862

(22) Filed: Sep. 8, 2023

(65) Prior Publication Data

US 2024/0114936 A1 Apr. 11, 2024

(30) Foreign Application Priority Data

Oct. 9, 2022 (CN) .......................... 202211225612.1

(51) Int. Cl.
| | |
|---|---|
| *A23L 7/10* | (2016.01) |
| *A23L 5/10* | (2016.01) |
| *A23L 5/30* | (2016.01) |
| *A23L 7/196* | (2016.01) |

(52) U.S. Cl.
CPC .................. *A23L 7/197* (2016.08); *A23L 5/13* (2016.08); *A23L 5/34* (2016.08); *A23L 7/196* (2016.08)

(58) Field of Classification Search
CPC ..... A23L 5/34; A23L 5/13; A23L 5/15; A23L 7/196–1975
See application file for complete search history.

(56) References Cited

U.S. PATENT DOCUMENTS

| | | | | | |
|---|---|---|---|---|---|
| 3,558,327 A | * | 1/1971 | Watkins | .................... | B02B 1/08 |
| | | | | | 219/678 |
| 3,626,838 A | * | 12/1971 | Gorakhpurwalla | .... | H05B 6/784 |
| | | | | | 219/699 |

| | | | | | |
|---|---|---|---|---|---|
| 4,385,074 A | * | 5/1983 | Weibye | .................... | A23L 19/14 |
| | | | | | 426/511 |
| 4,810,511 A | * | 3/1989 | Velupillai | ............... | A23L 7/196 |
| | | | | | 426/243 |
| 5,130,153 A | * | 7/1992 | McIlroy | ................ | A23L 7/1975 |
| | | | | | 426/511 |
| 2003/0188639 A1 | * | 10/2003 | Mori | ......................... | A23L 5/15 |
| | | | | | 99/451 |
| 2005/0025867 A1 | * | 2/2005 | Ames | ...................... | A23L 7/183 |
| | | | | | 426/465 |
| 2005/0260307 A1 | * | 11/2005 | Linn | ...................... | H05B 6/782 |
| | | | | | 426/241 |
| 2010/0323087 A1 | * | 12/2010 | Fukumori | ............... | A23L 7/196 |
| | | | | | 426/511 |
| 2011/0217438 A1 | * | 9/2011 | Ando | ...................... | A23L 7/196 |
| | | | | | 426/507 |
| 2015/0140162 A1 | * | 5/2015 | Johnson | ................ | A47J 36/027 |
| | | | | | 219/731 |

FOREIGN PATENT DOCUMENTS

| | | | | | |
|---|---|---|---|---|---|
| EP | | 3841891 A1 | * | 6/2021 | ............. A23L 7/196 |
| WO | WO-2016092418 A1 | * | 6/2016 | ............. A23L 7/196 |

OTHER PUBLICATIONS

Translation of CN 109043324A (Year: 2018).*
Translation of KR 20030008597A (Year: 2003).*
Translation of CN 113662134A (Year: 2021).*

* cited by examiner

*Primary Examiner* — Drew E Becker
(74) *Attorney, Agent, or Firm* — Procopio, Cory, Hargreaves & Savitch LLP

(57) ABSTRACT

The present disclosure provides a preparation method of an easy-to-cook whole grain based on microwave-induced cracking, and belongs to the technical field of food processing. In the present disclosure, the preparation method of an easy-to-cook whole grain includes the following steps: subjecting a whole grain to a heat-moisture treatment, and conducting short-time microwave-induced cracking, tempering, and cooling to obtain the easy-to-cook whole grain. The easy-to-cook whole grain obtained by the preparation method of the present disclosure has a complete grain, a slightly-expanded volume, and fine cracks on its surface. Compared with unprocessed whole grains, the easy-to-cook whole grain has a water absorption increased from 1.35 times to 1.9 times an original weight of the unprocessed whole grains during rice steaming.

5 Claims, No Drawings

PREPARATION METHOD OF EASY-TO-COOK WHOLE GRAIN BASED ON MICROWAVE-INDUCED CRACKING

CROSS REFERENCE TO RELATED APPLICATION

This patent application claims the benefit and priority of Chinese Patent Application No. 202211225612.1 filed with the China National Intellectual Property Administration on Oct. 9, 2022, the disclosure of which is incorporated by reference herein in its entirety as part of the present application.

TECHNICAL FIELD

The present disclosure relates to the technical field of food processing, in particular to a preparation method of an easy-to-cook whole grain based on microwave-induced cracking.

BACKGROUND

Whole grains are caryopsis that are whole, ground, broken, or tableted. The basic composition of a whole grain includes starchy endosperm, germ, and bran, and a relative proportion of each component is basically the same as that of the whole caryopsis. Whole grains are rich in a variety of nutrients, including phenols, flavones, tocopherol, anthocyanins, lignan, non-starch polysaccharides such as arabinoxylan and $\beta$-glucan, and physiologically active substances such as sterols and phytic acid. The whole grain has physiological functions of lowering blood lipid and blood glucose, anti-oxidation, anti-hypertension, and improving intestinal function. In the fifth edition of the "Dietary Guidelines for Chinese Residents" in 2022, the intake of whole grains was increased, and a proportion of refined grains was reduced to a certain extent. It was recommended to consume 50 g to 150 g of the whole grains and beans per day. The nutritional value of whole grains has been recognized around the world. However, the contained bran and germ lead to difficult cooking, short shelf life, and rough taste during the processing of whole grain foods. These defects result in poor acceptance by the consumers and restrict the development of whole grain food industry.

Currently, there are three approaches to improving the eating quality and shelf life of whole grains. (1) Superfine pulverization: the whole grains are pulverized with a superfine pulverizer to obtain an ultrafine powder of 10 μm or even 1 μm, so as to alleviate the rough taste of whole grains. Generally, the ultrafine powder is added to various foods as a raw material or an auxiliary material. (2) Extrusion processing: the whole grains are crushed to 20 to 40 meshes, and a whole grain-puffed powder or compound nutritional rice is obtained via mixing, thermal refining, and extruded expansion or extrusion forming, followed by crushing or drying. An obtained product is brewed or steamed for consumption. (3) Pre-gelatinization and drying: the whole grains are soaked, cooked, and pre-gelatinized, and then dried to a safe moisture content of less than 14% in order to prolong the shelf life. An obtained product is mixed with rice to conduct steaming during the consumption, and has a greatly improved mouthfeel.

Both the superfine pulverization and the extrusion processing crush and process whole grains into raw and auxiliary materials for foods, which destroy an original appearance of the whole grains. Meanwhile, the pre-gelatinization and drying of whole grains has a cumbersome process and high energy consumption for drying; moreover, due to rapid water swelling and water evaporation of whole grains, severe wrinkles appear on the surface of the products. In China, rice steaming with whole grains is still a traditional processing method of the staple food. The gelatinization characteristics of starch during the cooking of grains directly affect the taste of starch. Water penetrates into the interior of starch granules due to osmotic pressure, increasing the volume and quality of the starch granules several times. When a temperature reaches about 70° C., expanded starch granules form a uniform viscous body, and the starch is gelatinized. The degree of starch gelatinization is mainly affected by the water absorption. Whole grains resist the infiltration of moisture during cooking due to their dense cortex fibers. As a result, the internal starch cannot fully absorb water to swell, thus affecting the gelatinization properties of starch and the taste of rice. Therefore, there is an urgent need to find a method for processing whole grains that can increase the water absorption during rice steaming, promote the full gelatinization of starch, and enhance the mouthfeel of rice.

SUMMARY

An objective of the present disclosure is to provide a preparation method of an easy-to-cook whole grain based on microwave-induced cracking. In the present disclosure, the easy-to-cook whole grain prepared by the preparation method can greatly increase water absorption of the whole grain, promote the gelatinization of starch, and improve the mouthfeel.

To achieve the above objective, the present disclosure provides the following technical solutions:

The present disclosure provides a preparation method of an easy-to-cook whole grain based on microwave-induced cracking, including the following steps: subjecting a whole grain to a heat-moisture treatment, and conducting short-time microwave-induced cracking, tempering, and cooling to obtain the easy-to-cook whole grain; where the short-time microwave-induced cracking is conducted at 21 kW to 30 kW for 60 sec to 90 sec.

Preferably, the heat-moisture treatment is conducted by boiling water scalding or high-temperature steam.

Preferably, the heat-moisture treatment is conducted for 10 sec to 30 sec.

Preferably, the tempering is conducted for 10 min to 15 min.

Preferably, during the short-time microwave-induced cracking, the whole grain has a thickness of 8 mm to 10 mm and a width of 600 mm to 800 mm.

Preferably, a movement speed of the whole grain is 8 m/min to 10 m/min.

Preferably, the whole grain includes brown rice, black rice, oat, and highland barley.

The present disclosure further provides an easy-to-cook whole grain prepared by the preparation method.

Compared with the prior art, the present disclosure has the following beneficial effects:

The present disclosure provides a preparation method of an easy-to-cook whole grain based on microwave-induced cracking, including the following steps: subjecting a whole grain to a heat-moisture treatment, and conducting short-time microwave-induced cracking, tempering, and cooling to obtain the easy-to-cook whole grain. The easy-to-cook whole grain obtained by the preparation method of the present disclosure has a complete grain, a slightly-expanded volume, and fine cracks on its surface. Compared with unprocessed whole grains, the easy-to-cook whole grain of the present disclosure has a water absorption increased from 1.35 times to 1.9 times an original weight of the unprocessed whole grains during rice steaming. The obtained cooked rice has granules that are completely cracked, internal starch that overflows, and soft and glutinous mouthfeel. The easy-to-cook whole grain has a moisture content of less than 14% and a shelf life of 9 to 12 months at a room temperature. When steaming, the easy-to-cook whole grain can be cooked together with rice, and has moderate hardness, thereby meeting both the visual and taste needs of consumers.

DETAILED DESCRIPTION OF THE EMBODIMENTS

The present disclosure provides a preparation method of an easy-to-cook whole grain based on microwave-induced cracking, including the following steps: subjecting a whole grain to a heat-moisture treatment, and conducting short-time microwave-induced cracking, tempering, and cooling to obtain the easy-to-cook whole grain; where the short-time microwave-induced cracking is conducted at 21 kW to 30 kW for 60 sec to 90 sec.

In the present disclosure, the whole grain includes preferably brown rice, black rice, oat, and highland barley. The heat-moisture treatment is preferably conducted by boiling water scalding or high-temperature steam for preferably 10 sec to 30 sec. According to the characteristics of the cortex fiber structures of different whole grains, the heat-moisture treatment is conducted with corresponding heat-moisture approaches and time. The heat-moisture treatment can make the whole grain have higher osmotic pressure, such that high-temperature water molecules can quickly penetrate into the inner side of the whole grain cortex. The treatment strictly controls a treatment time and controls a penetration depth of water. Too long treatment time leads to excessive high-temperature water penetration. The subsequent microwave treatment leads to excessive gelatinization of internal starch and increased energy consumption. Too short treatment time results in high-temperature water not penetrating into the inner cortex. The subsequent microwave treatment cannot promote the moisture inside the cortex to quickly break through the cortex to destroy the dense whole grain cortex fibers, thereby affecting a cooking effect. Therefore, in order to achieve a desirable cooking effect, the moisture increase in the heat-moisture treatment should be controlled at 3% to 5%, and a particle temperature should be kept as high as possible to save the energy consumption of subsequent processing.

In the present disclosure, during the short-time microwave-induced cracking, the whole grain has a thickness of preferably 8 mm to 10 mm, more preferably 9 mml, and a width of 600 mm to 800 mm, more preferably 700 mm. A movement speed of the whole grain is preferably 8 m/min to 10 m/min, more preferably 9 m/min. The short-time microwave-induced cracking is conducted at preferably 21 kW to 30 kW, more preferably 25 kW for preferably 60 sec to 90 sec, more preferably 80 sec. In order to achieve better processing effect, save energy consumption, and shorten processing time, the whole grain after heat-moisture treatment quickly enters continuous microwave processing equipment. In the continuous microwave processing equipment, a magnetron is cooled by water cooling and equipped with a ventilation device, such that the heat energy is evenly distributed and the evaporated water is quickly discharged. During the microwave treatment, the moisture inside the cortex of whole grain quickly breaks through the cortex and evaporates under the action of high-power microwave energy, with an evaporation rate of 4% to 8%. In this way, the dense cortex structure is destroyed and fine cracks appear on the surface of the whole grain. This greatly improves the absorption rate and amount of water during the rice steaming, and improves the gelatinization characteristics and taste of the whole grain, such that the whole grain can be cooked together with the rice.

In the present disclosure, the heat-moisture treatment and the microwave treatment destroy the dense cortex fiber structure on the surface of the whole grain without changing the appearance of the whole grain. Accordingly, the water absorption during the rice steaming is greatly increased, the starch is fully gelatinized, and the taste of rice is improved.

In the present disclosure, the tempering is conducted for preferably 10 min to 15 min, more preferably 12 min. The moisture inside the whole grain moves rapidly under the action of high-power microwave energy, and may lead to uneven distribution of moisture inside the grain and affect the shelf life of the product. The tempering is conducted after the short-time microwave-induced cracking to balance the moisture distribution inside the grain and extend the shelf life of the easy-to-cook whole grain.

In the present disclosure, the cooling is preferably conducted to a room temperature. The preparation method further includes preferably vacuum packaging after the cooling. The cooled easy-to-cook whole grain has a moisture content of less than 14% and a shelf life of 9 to 12 months at a room temperature.

The present disclosure further provides an easy-to-cook whole grain prepared by the preparation method.

In the present disclosure, unless otherwise specified, all raw material components are commercially available products well known to persons skilled in the art.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1

1. Heat-moisture treatment of brown rice: according to a relatively thin structure of the cortex fibers of the brown rice, the brown rice was scalded with boiling water for 10 sec, and its water content was controlled at 5%.

2. Short-time microwave-induced cracking: the brown rice after the heat-moisture treatment at a thickness of 10 mm and a width of 600 mm was quickly fed into continuous microwave processing equipment at 10 m/min. In the continuous microwave processing equipment, a microwave powder was 25 kW, a magnetron was cooled by water cooling and equipped with a ventilation device, such that the heat energy was evenly distributed and the evaporated water was quickly discharged. The short-time microwave-induced cracking was conducted for 60 sec.

3. Tempering: after the short-time microwave-induced cracking, an obtained product was fed into a tempering chamber, where the tempering chamber had a discharge speed consistent with a feeding rate, and the tempering was conducted for 10 min.

4. Cooling: obtained tempered brown rice had a temperature of 40° C., the tempered brown rice was cooled to a room temperature through continuous air-cooling equipment, and easy-to-cook brown rice was obtained after vacuum packaging.

Example 2

1. Heat-moisture treatment of oat and highland barley: according to a relatively thick structure of the cortex fibers of the oat and highland barley, the oat and highland barley were treated with high-temperature steam for 30 sec, and their water contents were controlled at 4%.

2. Short-time microwave-induced cracking: the oat and highland barley after the heat-moisture treatment at a thickness of 8 mm and a width of 800 mm had larger particle sizes, and were quickly fed into continuous microwave processing equipment at 9 m/min. In the continuous microwave processing equipment, a microwave powder was 30 kW, a magnetron was cooled by water cooling and equipped with a ventilation device, such that the heat energy was evenly distributed and the evaporated water was quickly discharged. The short-time microwave-induced cracking was conducted for 80 sec.

3. Tempering: after the short-time microwave-induced cracking, an obtained product was fed into a tempering chamber, where the tempering chamber had a discharge speed consistent with a feeding rate, and the tempering was conducted for 15 min.

4. Cooling: obtained tempered oat and highland barley had a temperature of 50° C., the tempered oat and highland barley were cooled to a room temperature through continuous air-cooling equipment, and easy-to-cook oat and highland barley were obtained after vacuum packaging.

Example 3

1. Heat-moisture treatment of black rice: according to a relatively thin structure of the cortex fibers of the black rice, the black rice was scalded with boiling water for 20 sec, and its water content was controlled at 3%.

2. Short-time microwave-induced cracking: the black rice after the heat-moisture treatment at a thickness of 9 mm and a width of 700 mm was quickly fed into continuous microwave processing equipment at 8 m/min. In the continuous microwave processing equipment, a microwave powder was 21 kW, a magnetron was cooled by water cooling and equipped with a ventilation device, such that the heat energy was evenly distributed and the evaporated water was quickly discharged. The short-time microwave-induced cracking was conducted for 90 sec.

3. Tempering: after the short-time microwave-induced cracking, an obtained product was fed into a tempering chamber, where the tempering chamber had a discharge speed consistent with a feeding rate, and the tempering was conducted for 12 min.

4. Cooling: obtained tempered black rice had a temperature of 45° C., the tempered black rice was cooled to a room temperature through continuous air-cooling equipment, and easy-to-cook black rice was obtained after vacuum packaging.

Experimental Example 1

Taking the brown rice as an example, the rice was steamed according to a rice steaming mode of a common rice cooker. 250 g of the brown rice was washed twice, and water was added according to a rice-water weight ratio of 1:1.35 (tested in an early stage, the water was just completely absorbed during rice steaming). The rice steaming was started, and heat preservation was conducted for 5 min after the rice steaming. The cooker was opened and the rice was dispersed, and a small amount of rice was collected and cooled to a room temperature. The hardness, viscosity, chewiness, and elasticity of the rice were determined by a texture analyzer.

The easy-to-cook brown rice prepared in Example 1, rice, and Saiya easy-to-cook brown rice were steamed according to a same method as that of the above brown rice. The difference was that the water added to the easy-to-cook brown rice prepared in Example 1 had a rice-to-water weight ratio of 1:1.9 (tested in an early stage, the water was just completely absorbed during rice steaming). The water added to the rice and the Saiya easy-to-cook brown rice had a rice-to-water weight ratio of 1:1.35 (tested in an early stage, the water was just completely absorbed during rice steaming).

After heat preservation for 5 min, obtained steamed brown rice, steamed easy-to-cook brown rice of Example 1, steamed rice, and steamed Saiya easy-to-cook brown rice were dispersed, and cooled to a room temperature. The hardness, viscosity, chewiness, and elasticity of the above rice were determined by a texture analyzer. Specific results were shown in Table 1.

TABLE 1

| Texture parameters of different rice | | | | |
| --- | --- | --- | --- | --- |
| Sample name | Hardness/g | Viscosity | Chewiness | Elasticity |
| Steamed brown rice | 1389.46 | 596.17 | 412.89 | 0.59 |
| Steamed Saiya easy-to-cook brown rice | 993.56 | 458.14 | 376.45 | 0.62 |
| Steamed easy-to-cook brown rice of Example 1 | 624.75 | 322.69 | 254.63 | 0.66 |
| Steamed rice | 520.27 | 319.24 | 240.58 | 0.74 |

As shown from the data in Table 1, compared with untreated steamed brown rice, the treated steamed easy-to-cook brown rice of the present disclosure had significantly improved hardness, viscosity, chewiness, and elasticity, which were highly close to those of the steamed rice. This proved that the easy-to-cook brown rice of the present disclosure could be cooked together with the rice.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of an easy-to-cook whole grain based on microwave-induced cracking, the preparation method comprising following steps in sequence:

subjecting a whole grain to a heat-moisture treatment, and conducting microwave-induced cracking in a continuous microwave processing device, tempering the whole grain in a tempering chamber for 10 min to 15 min such that the whole grain after tempering has a temperature of 40-50° C., with a discharge speed is consistent with a feeding rate in the tempering chamber, and cooling the whole grain to obtain the easy-to-cook whole grain, wherein the heat-moisture treatment is conducted by boiling water, and wherein the short-time microwave-induced cracking is conducted at 21 kW to 30 kW for 60 sec to 90 sec.

2. The preparation method according to claim 1, wherein the heat-moisture treatment is conducted for 10 sec to 30 sec.

3. The preparation method according to claim 1, wherein during the short-time microwave-induced cracking, a bed layer of the whole grain has a thickness of 8 mm to 10 mm and a width of 600 mm to 800 mm.

4. The preparation method according to claim 2, wherein a movement speed of the bed layer of the whole grain is 8 m/min to 10 m/min.

5. The preparation method according to claim 1, wherein the whole grain comprises brown rice, black rice, oat, and highland barley.

* * * * *